(12) United States Patent
Arimilli et al.

(10) Patent No.: US 8,407,680 B2
(45) Date of Patent: Mar. 26, 2013

(54) OPERAND DATA STRUCTURE FOR BLOCK COMPUTATION

(75) Inventors: Ravi K. Arimilli, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 12/336,301

(22) Filed: Dec. 16, 2008

(65) Prior Publication Data
US 2010/0153931 A1    Jun. 17, 2010

(51) Int. Cl.
*G06F 9/45* (2006.01)

(52) U.S. Cl. ........................................ 717/150; 717/140

(58) Field of Classification Search .................... 717/150
See application file for complete search history.

(56) References Cited

U.S. PATENT DOCUMENTS

| | | | |
|---|---|---|---|
| 4,926,317 A * | 5/1990 | Wallach et al. ................... | 711/3 |
| 5,299,320 A * | 3/1994 | Aono et al. .................... | 712/231 |
| 6,233,732 B1 * | 5/2001 | Matsuyama et al. .......... | 717/141 |
| 6,418,527 B1 | 7/2002 | Rozenshein et al. | |
| 6,446,190 B1 * | 9/2002 | Barry et al. .................... | 712/24 |
| 6,477,221 B1 | 11/2002 | Ning | |
| 6,505,288 B1 | 1/2003 | Jang et al. | |
| 6,510,494 B1 | 1/2003 | Arimilli et al. | |
| 6,519,768 B1 | 2/2003 | Hughes et al. | |
| 6,615,340 B1 * | 9/2003 | Wilmot, II .................... | 712/209 |
| 6,826,679 B1 | 11/2004 | Laurenti | |
| 6,851,010 B1 | 2/2005 | Rao et al. | |
| 6,931,517 B1 | 8/2005 | Col et al. | |
| 6,941,444 B2 * | 9/2005 | Fong ............................ | 711/214 |
| 6,988,183 B1 | 1/2006 | Wong | |
| 7,076,638 B2 | 7/2006 | Heishi | |
| 7,089,408 B2 | 8/2006 | Check et al. | |
| 7,111,156 B1 | 9/2006 | Mang | |
| 7,249,357 B2 | 7/2007 | Landman et al. | |
| 7,251,721 B1 | 7/2007 | Nguyen | |
| 7,284,115 B2 | 10/2007 | McGrath | |
| 7,290,092 B2 | 10/2007 | Agaram et al. | |
| 7,343,482 B2 | 3/2008 | Biles et al. | |
| 7,350,055 B2 * | 3/2008 | Biles et al. ....................... | 712/34 |

(Continued)

OTHER PUBLICATIONS

U.S. Appl. No. 12/336,342, "Specifying an Addressing Relationship in an Operand Data Structure," Non-Final Office Action dated Oct. 6, 2011.

(Continued)

*Primary Examiner* — Don Wong
*Assistant Examiner* — Theodore Hebert
(74) *Attorney, Agent, or Firm* — Yudell Isidore Ng Russell PLLC

(57) ABSTRACT

In response to receiving pre-processed code, a compiler identifies a code section that is not a candidate for acceleration and a code block that is a candidate for acceleration. The code block specifies an iterated operation having a first operand and a second operand, where each of multiple first operands and each of multiple second operands for the iterated operation has a defined addressing relationship. In response to the identifying, the compiler generates post-processed code containing lower level instruction(s) corresponding to the identified code section and creates and outputs an operand data structure separate from the post-processed code. The operand data structure specifies the defined addressing relationship for the multiple first operands and for the multiple second operands. The compiler places a block computation command in the post-processed code that invokes processing of the operand data structure to compute operand addresses.

15 Claims, 8 Drawing Sheets

U.S. PATENT DOCUMENTS

| | | | |
|---|---|---|---|
| 7,380,099 | B2 | 5/2008 | Mathew et al. |
| 7,418,578 | B2 * | 8/2008 | Nguyen et al. ............... 712/218 |
| 2002/0112131 | A1 | 8/2002 | Fong |
| 2002/0124157 | A1 | 9/2002 | Le |
| 2003/0074543 | A1 | 4/2003 | Djafarian |
| 2004/0064684 | A1 | 4/2004 | Kalluri |
| 2004/0139299 | A1 | 7/2004 | Busaba |
| 2004/0176941 | A1 | 9/2004 | Ku |
| 2005/0066150 | A1 | 3/2005 | Mehta |
| 2005/0076179 | A1 | 4/2005 | Schopp |
| 2005/0182916 | A1 | 8/2005 | Kageyama |
| 2005/0182918 | A1 * | 8/2005 | Col ............................... 712/218 |
| 2005/0283589 | A1 | 12/2005 | Matsuo |
| 2006/0026577 | A1 * | 2/2006 | Dinechin et al. ............. 717/148 |
| 2006/0048105 | A1 | 3/2006 | Plummer |
| 2006/0069901 | A1 | 3/2006 | Mathew et al. |
| 2006/0149929 | A1 | 7/2006 | Cervini |
| 2006/0161612 | A1 | 7/2006 | Gustavson et al. |
| 2006/0242387 | A1 | 10/2006 | Heishi |
| 2007/0124722 | A1 | 5/2007 | Gschwind |
| 2007/0180437 | A1 | 8/2007 | Rubin |
| 2007/0192568 | A1 | 8/2007 | Fish, III |
| 2008/0040401 | A1 * | 2/2008 | Reinsch ....................... 707/203 |
| 2008/0052470 | A1 | 2/2008 | Agram et al. |
| 2008/0065834 | A1 | 3/2008 | Check et al. |
| 2010/0153648 | A1 * | 6/2010 | Arimilli et al. ............... 711/125 |
| 2010/0153681 | A1 * | 6/2010 | Arimilli et al. ............... 711/200 |
| 2010/0153683 | A1 * | 6/2010 | Arimilli et al. ............... 711/218 |
| 2010/0153938 | A1 * | 6/2010 | Arimilli et al. ............... 717/151 |

OTHER PUBLICATIONS

U.S. Appl. No. 12/336,315, "Block Driven Computation with an Address Generation Accelerator," Non-Final Office Action dated Oct. 7, 2011.

Waltersson, R.;"Implemenation of a Program Address Generator in a DSP processor"; Reg. nr: LITH-ISY-EX-ET-0257-2003; Department of Electrical Engineering, Division of Electronic Systems; Linkopings University; May 26, 2003, pp. 1-34.

Park, J. et al; "Register Pointer Architecture for Efficient Embedded Processors"; EDAA 978-3-9810801-2-4; 2007; pp. 1-6.

International PCT Application No. PCT/EP2009/063718; International Search Report mailed Dec. 23, 2009.

International PCT Application No. PCT/EP2009/063718; Written Opinion of the International Searching Authority mailed Dec. 23, 2009.

Hughey, R.; Blas, D.A.; "The UCSC Kestrel Application-Unspecific Processor", pp. 163-168, Issue Date: Sep. 2006, Date of Current Version : Dec. 4, 2006.

Arimilli et al., U.S. Appl. No. 12/336,315, Notice of Allowance dated Jun. 6, 2012.

U.S. Appl. No. 12/336,315, filed Dec. 16, 2008 entitled "Block Driven Computation With an Address Generation Accelerator"; Notice of Allowance dated Jun. 6, 2012.

U.S. Appl. No. 12/336,350, filed Dec. 16, 2008 entitled "Block Driven Computation Using a Caching Policy Specified in an Operand Data Structure"; Final Office action dated Jun. 15, 2012.

U.S. Appl. No. 12/336,350, filed Dec. 16, 2008 entitled "Block Driven Computation Using a Caching Policy Specified in an Operand Data Structure"; Non-Final Office action dated Nov. 15, 2011.

U.S. Appl. No. 12/363,342, filed Dec. 16, 2008 entitled "Specifying an Addressing Relationship in an Operand Data Structure"; Notice of Allowance dated May 29, 2012.

U.S. Appl. No. 12/336,332, filed Dec. 16, 2008 entitled "Computation Table for Block Computation"; Notice of Allowance dated Jul. 20, 2012.

U.S. Appl. No. 12/336,332, filed Dec. 16, 2008 entitled "Computation Table for Block Computation"; Non-Final Office action dated Nov. 25, 2011.

* cited by examiner

OPERAND DATA STRUCTURE FOR BLOCK COMPUTATION

CROSS-REFERENCE

The present application is related to the following copending applications, which are incorporated herein by reference in their entireties:

(1) U.S. patent application Ser. No. 12/336,315;
(2) U.S. patent application Ser. No. 12/336,332;
(3) U.S. patent application Ser. No. 12/336,342; and
(4) U.S. patent application Ser. No. 12/336,350.

BACKGROUND OF THE INVENTION

1. Technical Field

The present invention relates in general to data processing.

2. Description of the Related Art

A number of trends currently influence the development of server-class and mainframe computer systems. In particular, transistor densities within integrated circuits continue to increase according to Moore's Law, which in its current formulation posits that the number of transistors per unit area on integrated circuits will double approximately every 18 months. In addition, processor frequencies continue to double approximately every 2 years. Furthermore, system scale (i.e., the number of central processing units (CPUs) in the system) continues to grow to tens, hundreds, and in some cases, even thousands of processors. The result of these trends is that peak performance of server-class and mainframe computer systems has escalated rapidly, with recently developed large-scale high performance computing (HPC) systems boasting peak performance figures in the hundreds of TFLOPS (trillion floating-point operations per second).

Unfortunately, sustained performance in high performance computing systems has not improved at the pace of peak performance, and in fact, the ratio of sustained performance to peak performance while presently low (e.g., 1:10) is generally declining. With such unutilized computational capacity available, significant attention is now being devoted to achieving greater sustained performance.

SUMMARY OF THE INVENTION

The present invention appreciates that greater performance (and greater sustained-to-peak performance) can be achieved if the generation of addresses within one or more processors of a data processing system is accelerated.

A processor includes at least one execution unit that executes instructions, at least one register file, coupled to the at least one execution unit, that buffers operands for access by the at least one execution unit, and an instruction sequencing unit that fetches instructions for execution by the execution unit. The processor further includes an operand data structure and an address generation accelerator. The operand data structure specifies a first relationship between addresses of sequential accesses within a first address region and a second relationship between addresses of sequential accesses within a second address region. The address generation accelerator computes a first address of a first memory access in the first address region by reference to the first relationship and a second address of a second memory access in the second address region by reference to the second relationship.

DETAILED DESCRIPTION OF ILLUSTRATIVE EMBODIMENT

Figure 1:
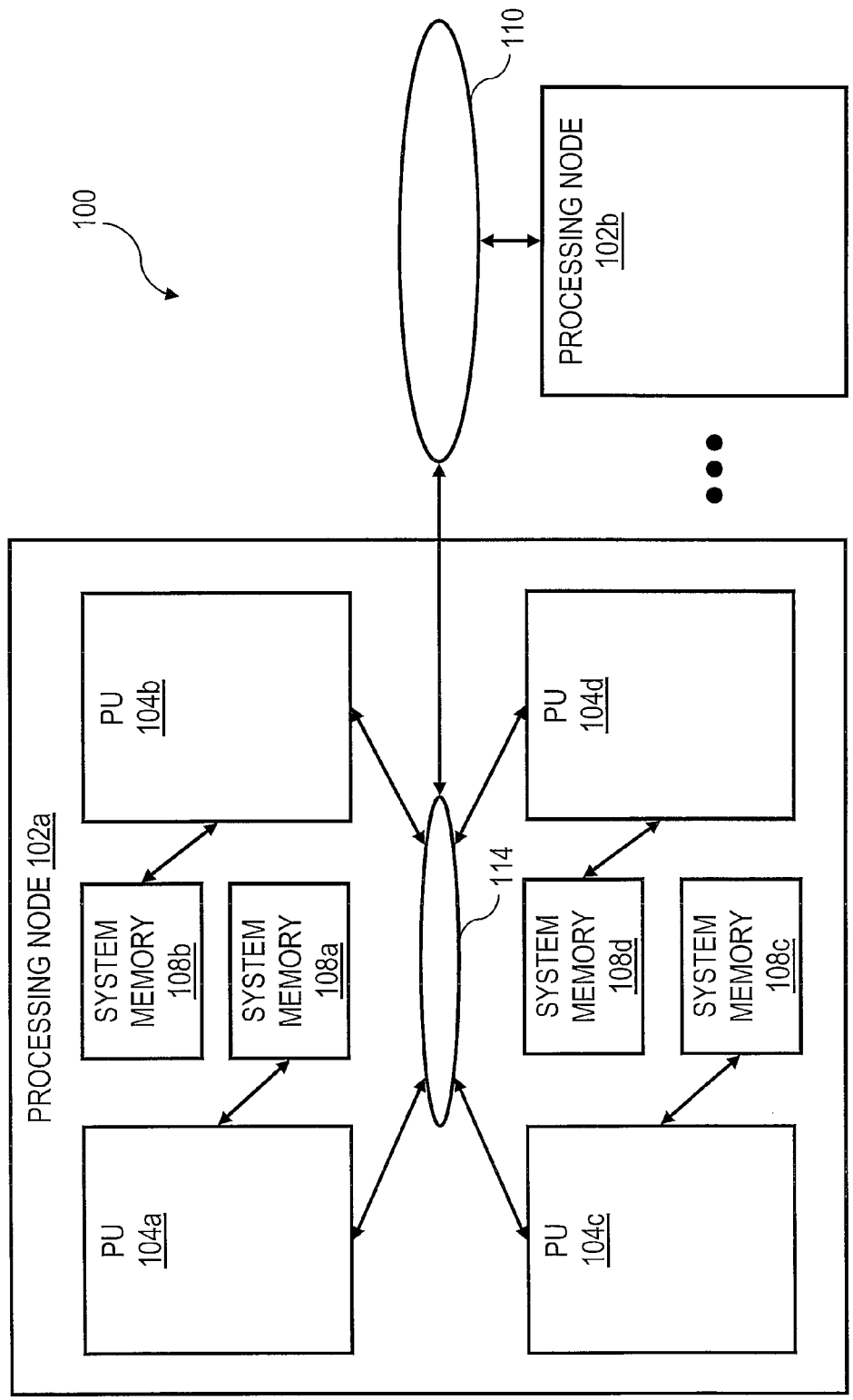
FIG. 1 is high level block diagram of a data processing system in accordance with the present invention.

With reference now to the figures and, in particular, with reference to FIG. 1, there is illustrated a high level block diagram of an exemplary embodiment of a multiprocessor data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core 200 (FIG. 2) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
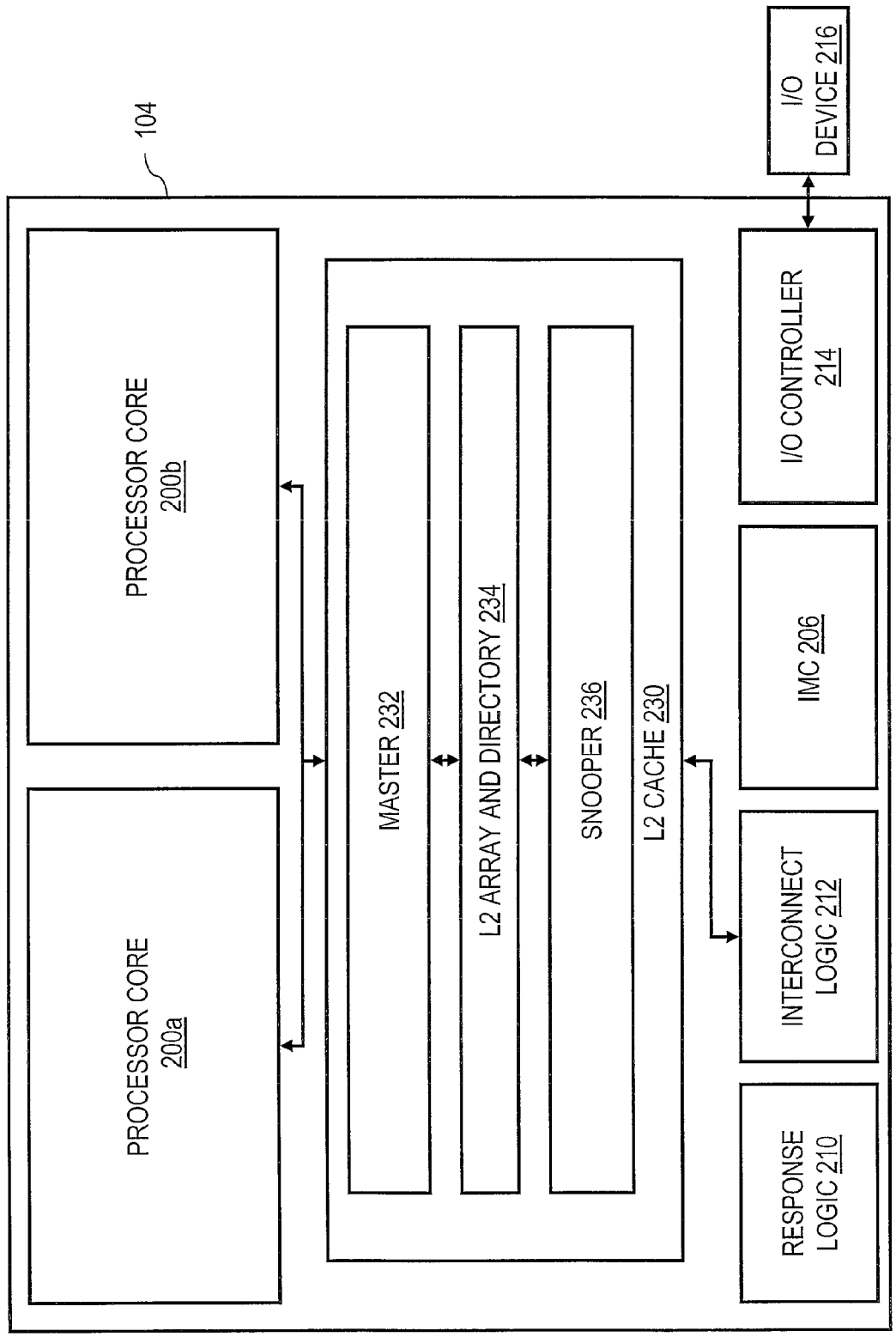
FIG. 2 is a high level block diagram of a processing unit from FIG. 1.

Referring now to FIG. 2, there is depicted a more detailed block diagram of an exemplary processing unit 104 in accordance with the present invention. In the depicted embodiment, each processing unit 104 includes multiple (e.g., two) processor cores 200a, 200b for independently processing instructions and data. The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped on the local interconnect 114.

In the illustrative embodiment, the cache memory hierarchy of processing unit 104 includes a store-through level one (L1) cache within each processor core 200 and a level two (L2) cache 230 shared by all processor cores 200a, 200b of the processing unit 104. L2 cache 230 includes an L2 array and directory 234, as well as a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 200 or shared by multiple processor cores 200.

Still referring to FIG. 2, each processing unit 104 further includes an instance of response logic 210, which implements a portion of the distributed snoop-based coherency signaling mechanism that maintains cache coherency within data processing system 100. In addition, each processing unit 104 includes an instance of forwarding logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
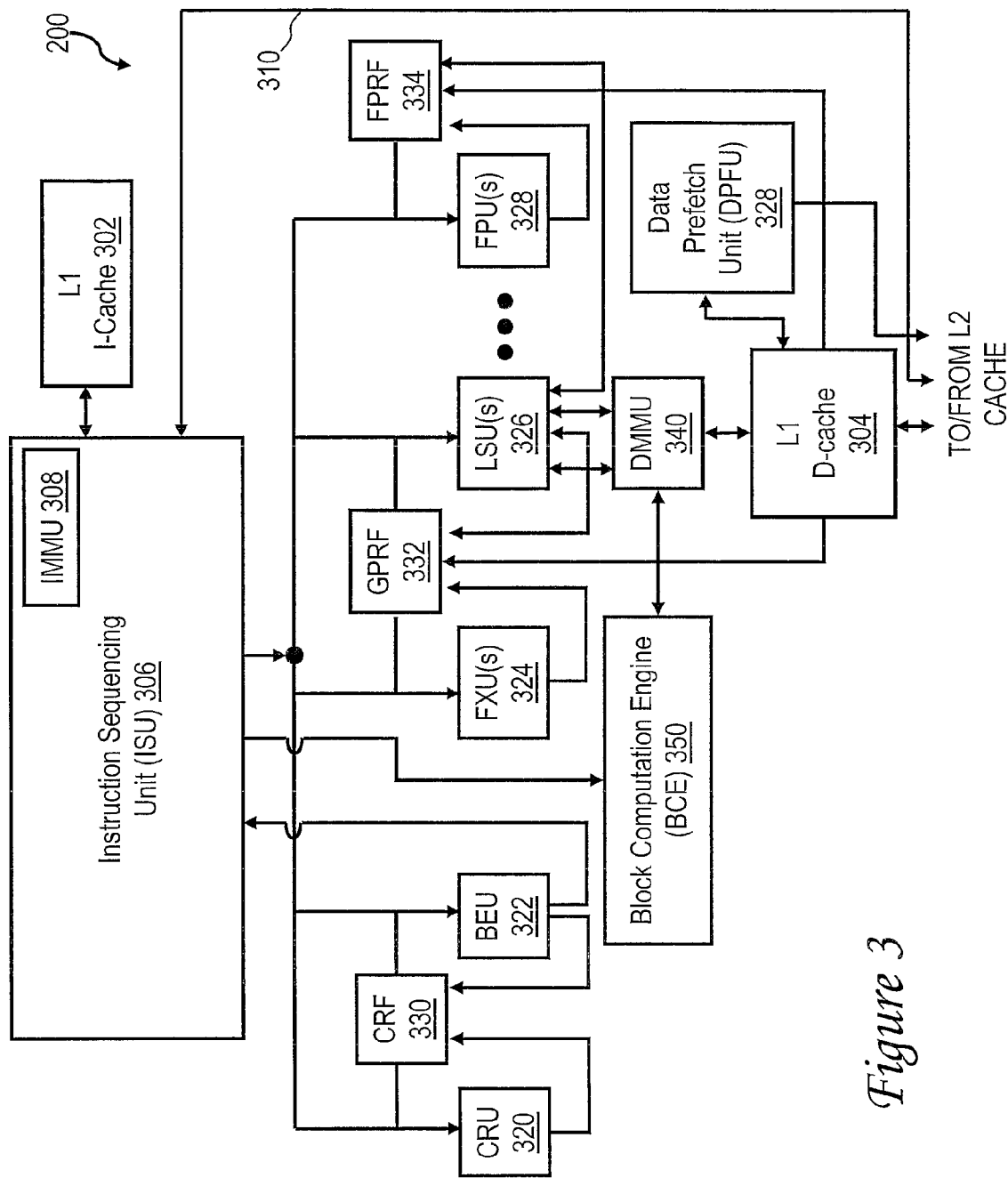
FIG. 3 is a more detailed block diagram of a processor core from FIG. 2.

With reference now to FIG. 3, there is illustrated a more detailed block diagram of one of the processor cores 200 from FIG. 2. As shown, processor core 200 includes bifurcated level one (L1) instruction and data caches 302 and 304, which temporarily buffer instructions and operand data, respectively, that are likely to be accessed by processor core 200. In addition, processor core 200 has an instruction sequencing unit (ISU) 306 that fetches instructions from L1 I-cache 302 utilizing real addresses obtained by the effective-to-real address translation (ERAT) performed by instruction memory management unit (IMMU) 308. As will be appreciated by those skilled in the art, ISU 306 may demand fetch (i.e., non-speculatively fetch) instructions within one or more active threads of execution, or speculatively fetch instructions that may or may not ultimately be executed. In either case, if a requested set of instructions does not reside in L1 I-cache 302, then ISU 306 requests the relevant set of instructions from an L2 cache 230 (and/or lower level memory) via I-cache reload bus 310.

Instructions fetched by ISU 306 are initially buffered within ISU 306 and may be pre-processed, for example, to perform branch prediction or to translate the instructions utilizing microcode. ISU 306 allocates resources needed by particular instructions and then dispatches the instructions to execution units, such as execution units 320-328, possibly out-of-program-order, based upon instruction type. Thus, condition-register-modifying instructions and branch instructions are dispatched to condition register unit (CRU) 320 and branch execution unit (BEU) 322, respectively, fixed-point and load/store instructions are dispatched to fixed-point unit(s) (FXUs) 324 and load-store unit(s) (LSUs) 326, respectively, and floating-point instructions are dispatched to floating-point unit(s) (FPUs) 328. Of course, one or more other types of execution units, such as vector execution units, and one or more types of register files (e.g., a vector register file) may also be implemented. After possible queuing and buffering, the dispatched instructions are executed opportunistically or in-order by execution units 320-328.

During execution within one of execution units 320-328, an instruction may receive input operands, if any, from one or more architected and/or rename registers within a register file 330-334 coupled to the execution unit. Data results of instruction execution (i.e., destination operands), if any, are similarly written to register files 330-334 by execution units 320-328. For example, FXU 324 receives input operands from and stores destination operands to general-purpose register file (GPRF) 332, and FPU 328 receives input operands from and stores destination operands to floating-point register file (FPRF) 334. LSU 326 similarly receives input operands from GPRF 332, computes target effective addresses, and causes data to be transferred between L1 D-cache 304 and both GPRF 332 and FPRF 334, following effective-to-real address translation by data memory management unit (DMMU) 340. Similarly, when executing condition-register-modifying or condition-register-dependent instructions, CRU 320 and BEU 322 access control register file (CRF) 330, which may contain, for example, a condition register, link register, count register and rename registers of each. BEU 322 accesses the values of the condition, link and count registers to resolve conditional branches to obtain a path address, which BEU 322 supplies to instruction sequencing unit 306 to initiate instruction fetching along the indicated path. After an execution unit finishes execution of an instruction, the execution unit notifies ISU 306, which schedules completion of instructions.

Processor core 200 also optionally but preferably includes a data prefetch unit (DPFU) 328 that speculatively prefetches data in advance of demand. That is, based upon recently observed memory access patterns, DPFU 328 provides speculative data fetch addresses to L2 cache 230 or lower level memory in order to retrieve data that is likely to be accessed by processor core 200 into L1 D-cache 304. In this manner, the average data access latency is improved.

As can be seen from the foregoing description of the operation of processor core 200, execution of instructions by execution units 320-328 generally follows a common pattern. As an example of this pattern, consider the steps attendant to the execution of a floating-point instruction, which are summarized in the high level logical flowchart depicted in FIG. 4.

Figure 4:
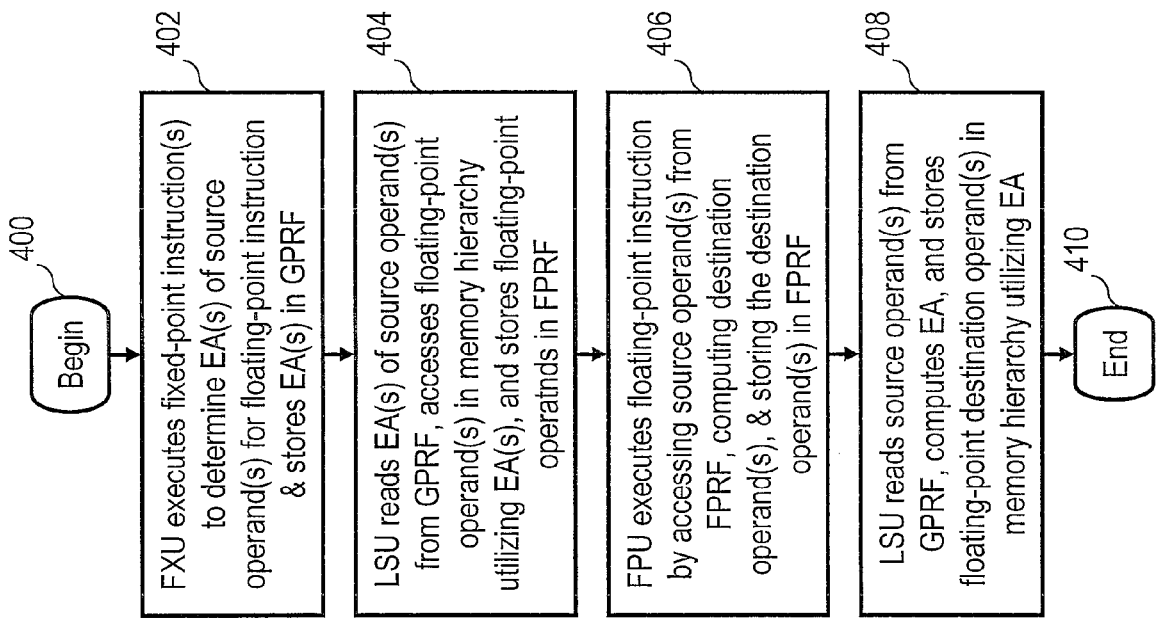
FIG. 4 is a high level block diagram of an exemplary process illustrating steps attendant to execution of a floating-point instruction by the floating-point unit (FPU) of FIG. 3.

The process depicted in FIG. 4 begins at block 400 at an arbitrary point in the execution of a stream of instructions and then proceeds to block 402. Block 402 illustrates an FXU 324 executing one or more fixed-point instructions to determine the effective address(es) of one or more source operands of a floating-point instruction subsequently executed at block 406. Following execution, FXU 324 stores the effective address(es) of the source operand(s) in one or more GPRs in GPRF 332. Next, at block 404, an LSU 326 executes a floating-point load instruction. In executing the floating-point load instruction, LSU 326 reads the effective address(es) of the floating-point source operand(s) from GPRF 332, accesses the floating-point source operand(s) in the memory hierarchy, and stores the floating-point source operand(s) in one or more FPRs in FPRF 334. At block 406, an FPU 328 executes the floating-point instruction. In executing the floating-point instruction, FPU 328 accesses the one or more floating-point source operand(s) in FPRF 334, computes one or more floating-point destination operand(s), and stores the floating-point destination operand(s) in one or more FPRs in FPRF 334. Finally, at block 408, an LSU 326 executes a floating-point store instruction to place the execution results of the floating-point instruction in the memory hierarchy. In executing the floating-point store instruction, LSU 326 reads one or re source operands from GPRF 332 (the computation of which may require execution by FXU 324 of one or more additional fixed-point instructions), computes a target effective address, and stores the floating-point destination operand(s) in the memory hierarchy at a location associated with the target effective address. Following block 408, the illustrated process terminates at block 410.

As will be appreciated, the process illustrated in FIG. 4 is often repeated numerous times during program execution, for example, when handling a scientific workload. Because many scientific programs repetitively perform the same floating-point computation on input operands that have a defined distribution within the effective address space and store the resulting destination operands in the effective address space with a defined distribution, the present invention appreciates that performance can be improved by, inter alia, accelerating generation of effective addresses of input and destination operands. Accordingly, in at least some embodiments, including that depicted in FIG. 3, processor core 200 further includes a block computation engine (BCE) 350 that accelerates the computation of effective addresses of input and destination operands for blocks of instructions. In the illustrated embodiment, BCE 350 is coupled to ISU 306, which initiates processing by BCE 350, and to DMMU 340, which converts the effective addresses of memory accesses generated by BCE 350 into corresponding real addresses utilized to access the memory hierarchy.

Figure 5:
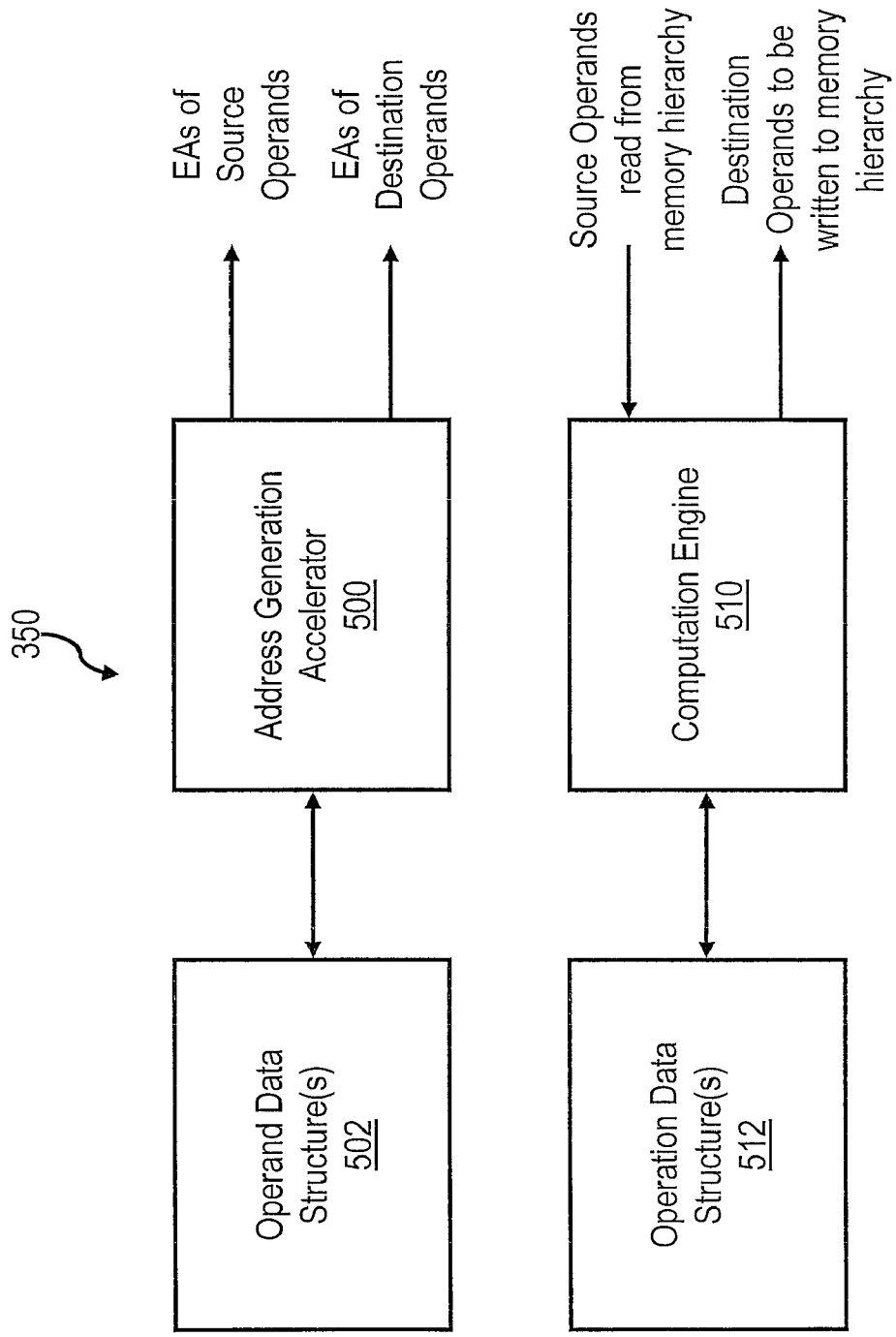
FIG. 5 is a more detailed block diagram of an exemplary embodiment of the block computation engine (BCE) of FIG. 3.

With reference now to FIG. 5, there is illustrated a more detailed block diagram of block computation engine (BCE) 350 of FIG. 3. As shown, BCE 350 includes an address generation accelerator (AGA) 500 that generates and outputs read requests specifying the effective addresses (EAs) of source operands to be read from the memory hierarchy. AGA 500 also generates and outputs write requests specifying the EAs of destination operands to be written into the memory hierarchy. As described in further detail below, AGA 500 generates the read and write requests by reference to one or more operand data structures 502 accessible to AGA 500. As indicated by the coupling of BCE 350 and DMMU 340 in FIG. 3, address generation accelerator 500 provides the EAs of the memory access requests to DMMU 340, which translates the EAs into real addresses utilized to access the memory hierarchy.

In at least some embodiments, the EAs generated by AGA 500 are utilized to support execution of instructions by execution units 320-328 (and a vector execution unit, if present) that take as inputs one or more input operands associated with an AGA-generated EA and produce as output or more destination operands associated with an AGA-generated EA. In other embodiments, AGA 500 further includes a computation engine 510 that applies an operation indicated by operation data structure(s) 512 to the input operand(s) associated with the AGA-generated EA(s) to obtain one or more destination operand(s) associated with the AGA-generated EA(s).

AGA 500 and computation engine 510 may be implemented, for example, utilizing programmable logic arrays (PLAs), field programmable gate arrays (FPGAs), or one or more arithmetic logic units (ALUs).

It should be understood that although FIG. 5 depicts operand data structures 502 and operation data structures 512 as residing in dedicated storage within BCE 350, in other embodiments operand data structure(s) 502 and operand data structure(s) 512 may alternatively reside in L1 D-cache 304 or in other data storage facilities of processor core 200.

Figure 6B:
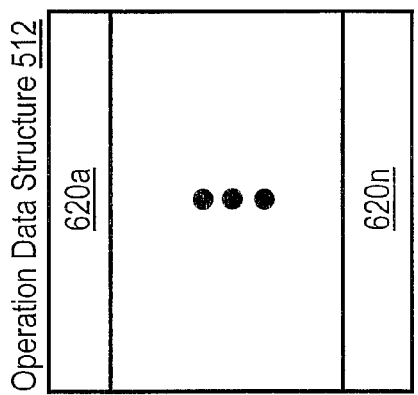
FIG. 6B depicts an exemplary embodiment of the operation data structure of FIG. 5.
Figure 6A:
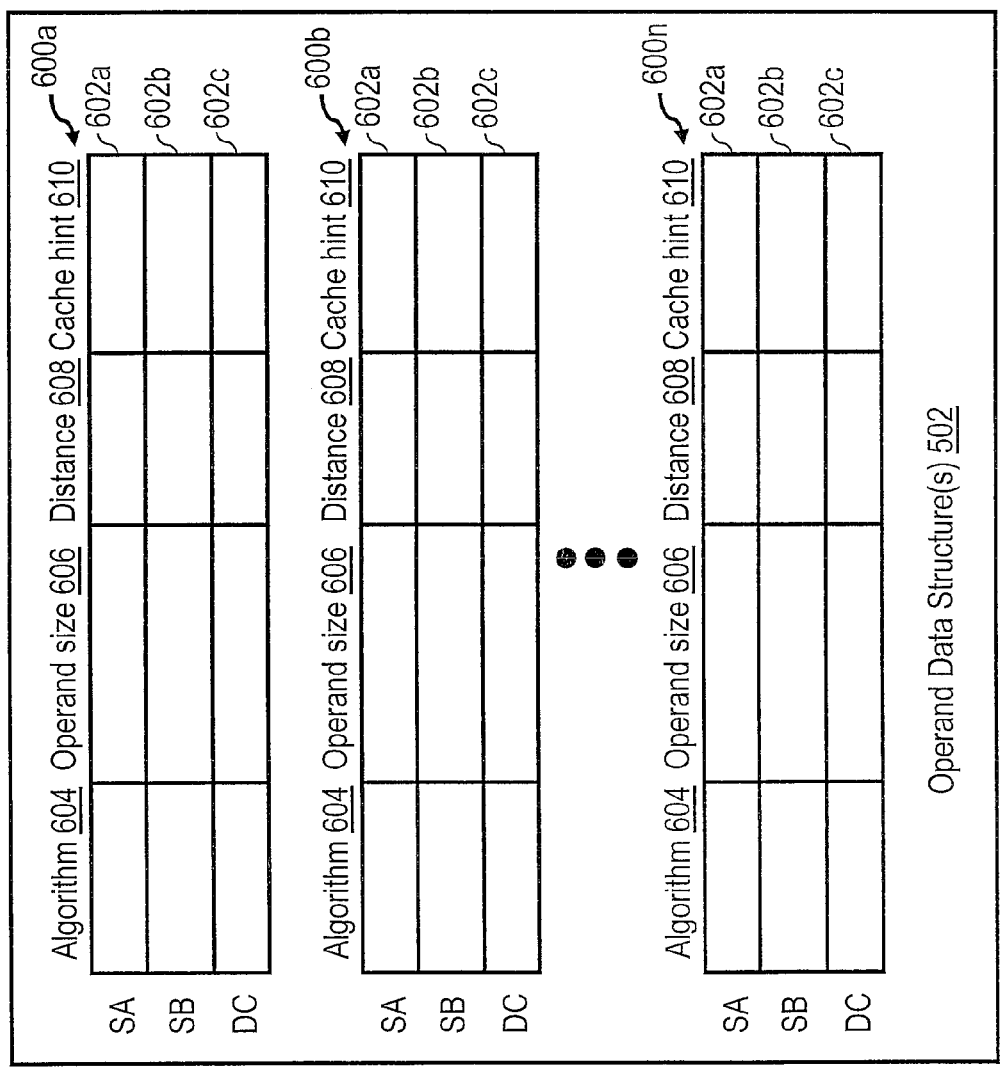
FIG. 6A depicts an exemplary embodiment of the operand data structure of FIG. 5.

Referring now to FIGS. 6A-6B, there are depicted block diagrams of exemplary embodiments of operand data structure(s) 502 and operation data structure(s) 512. Turning first to FIG. 6A, the depicted embodiment of operand data structure(s) 502 includes one or more operand tables 600a, 600b, . . . , 600n, each providing information utilized by AGA 500 to compute operand EAs for a respective block of code. That is, in response to commands by ISU 306, AGA 500 accesses operand table 600a to compute EAs for a first code block, accesses operand table 600b to compute EAs for a second code block, and accesses operand table 600n to compute EAs for a subsequent third code block.

As further illustrated in FIG. 6A, in the depicted exemplary embodiment, each operand table 600 contains at least three entries, namely, source operand A (SA) entry 602a, source operand B (SB) entry 602b and destination operand C (DC) entry 602c. Of course, additional entries supporting additional source and destination operands can be implemented, as necessary. In the illustrated embodiment, each entry 602 contains a number of fields including an algorithm field 604 indicating an algorithm utilized to compute the EA of the next operand of the given type, an operand size field 606 indicating a size of the input or destination operand associated with the EA, a distance field 608 indicating a number of EAs to be computed for the entry, and a cache hint field 610 indicating a caching policy, for example, whether or not the operand is preferably cached and, if so, at what cache level in the cache hierarchy. Each entry 602 may optionally contain an additional field indicating a base effective address from which other operand EAs are to be computed. The base effective address information can be alternatively communicated as a parameter of a block computation initiation signal, as discussed further below.

Referring now to FIG. 6B, operation data structure(s) 512 may similarly be implemented as a table. In this embodiment, one operation data structure 512 is implemented and includes a plurality of entries 620a-620n for indicating operations to be performed on one or more source operands to obtain one or more destination operands. Each of the plurality of entries 620a-620n preferably (but not necessarily) uniquely corresponds to a particular code block, meaning that computation engine 520 applies the operation indicated by each entry 620 to each set of input operand(s) retrieved from the memory hierarchy by AGA 500 to obtain one or more destination operands.

Although FIGS. 6A-6B illustrate exemplary embodiments of operand data structure(s) 502 and operation data structures 512 in which tables are employed, it should be appreciated that in other embodiments one or more other types of data structures, such as arrays, linked lists, etc., may alternatively or additionally be utilized.

Figure 7:
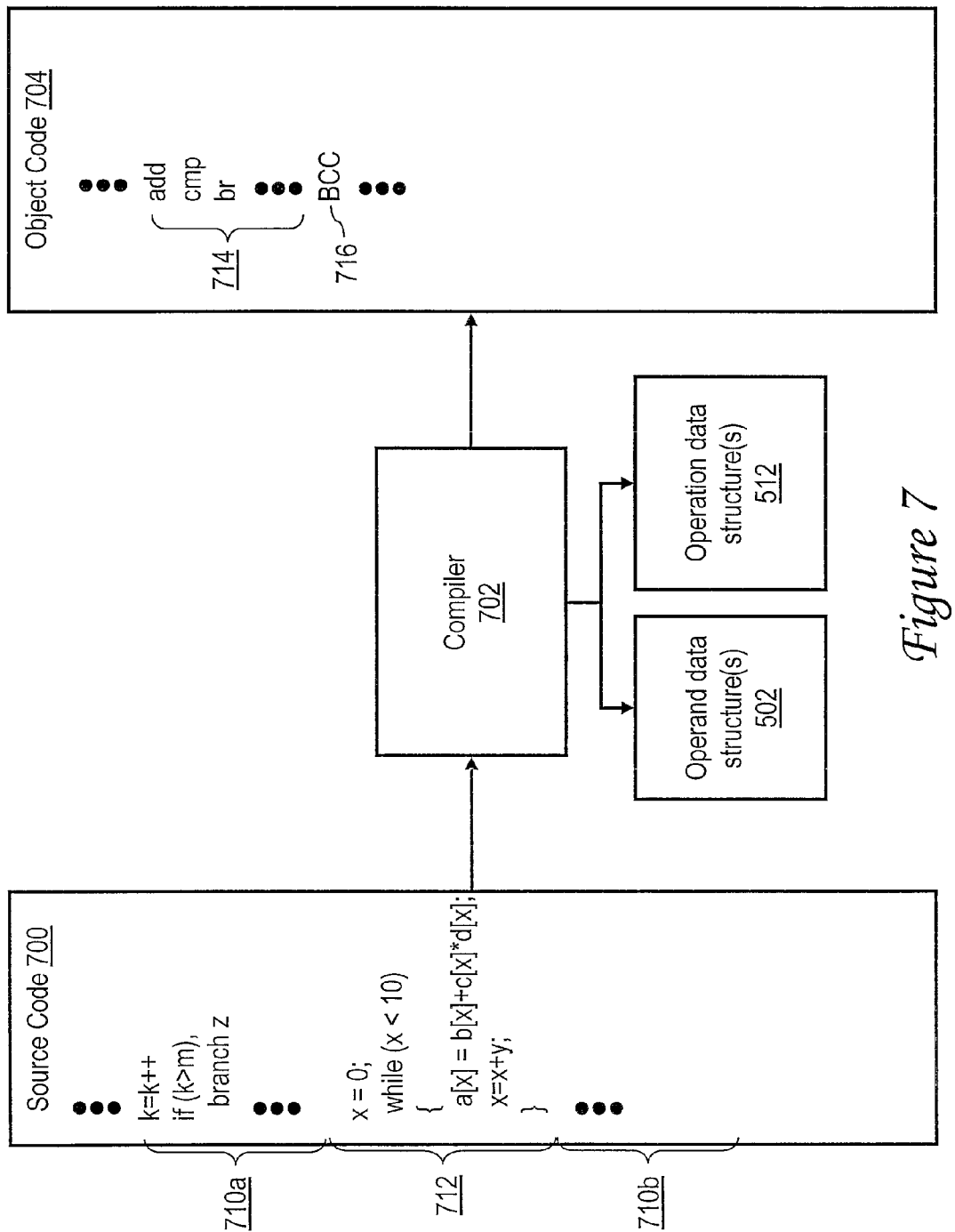
FIG. 7 is a process flow diagram depicting the generation from pre-processed code, such as source code, of post-processed code, such as object code, together with associated operand and operation data structures supporting code block processing.

With reference now to FIG. 7, there is illustrated a data flow diagram illustrating an exemplary process for generating one or more operand data structures 502 and one or more operation data structures 512. In the depicted process, program code, such as compiler 702, which may reside in volatile or non-volatile tangible data storage and be executed on a data processing system such as data processing system 100 of FIG. 1 (or any other suitable data processing system), receives pre-processed code, such as source code 700 or intermediate code, and compiles the pre-processed code to obtain post-processed code, such as object code 704 (or some intermediate code). In the compilation process, compiler 702 also generates one or more operand data structures 502 and one or more operation data structures 512.

In general, source code 700 contains instructions, statements or commands written, for example, in a high level language or script. In the depicted example, source code 700 includes code sections 710a, 710b that are not candidates for processing by BCE 350. For example, code section 710a contains a conditional branch dependent upon the relative values of variables x and y. In addition, source code 700 includes one or more code blocks, such as code block 712, which are candidates for processing by BCE 350. In the depicted example, code block 712 includes a while loop that performs a floating-point multiply-add operation on floating-point values within arrays b, c and d that are selected by the value of the loop variable x and then places the result of each computation at a location within array a again selected by the value loop variable x.

In response to receipt of source code 700, compiler 702 identifies code sections that are not candidates for acceleration and generates corresponding object code 714 (e.g., assembly language code or machine code). For example, in the present example, compiler 702 generates assembly instructions corresponding to the conditional branch indicated by code section 710a. In addition, compiler 702 identifies one or more code blocks, such as code block 712, which are candidates for acceleration and, for each such code block, generates data structures containing corresponding entries, such as an operand data structure 502 and operation data structures 512.

Compiler 702 does not, however, generate assembly code (or other lower-level code) explicitly directing the functionality of code block 712. Instead, compiler 702 inserts into object code 704 a block computation command (BCC) 716 that, when processed by a processor core 200 including a BCE 350, will invoke operation of BCE 350 on the entries in operand data structure 502 and operation data structure 512 to achieve the functionality specified by code block 712. Because the BCC is not intended for direct execution in an execution unit of processor core 200, the BCC need not belong to or conform to the instruction set architecture employed for the instructions executed by execution units 320-328.

In the depicted example, compiler 502 creates an operand table 600 containing three source operand entries 602 for source operands b[x], c[x] and d[x] and a destination operand entry 602 for destination operand a[x]. Compiler 702 then places the algorithm x=x+y in the algorithm field 604 of each of these entries 602 and places the operand size 8h (representing the size of an 8-byte single precision floating-point value) in the operand size field 606 of each entry 602. In the distance field 608 of each entry 602, compiler 702 places a value corresponding to the decimal value 10, which represents the number of times the while loop in code block 704 is to be executed. Finally, compiler 702 places cache hints, if any, associated with the source and destination operands in cache hint fields 610. Compiler 702 determines the cache hints, for example, by reference to future use of the source and destination operands. For example, if a destination operand is computed, but never again referenced, compiler 702 indicates in cache hint field 610 that destination operand should not be cached. Alternatively, if the destination operand is referenced again immediately following its computation (e.g., as an input operand of the computation of a subsequent destination operand), compiler 702 indicates in cache hint field 610 that the destination operand should be cached, for example, in L1 D-cache 304.

Figure 8:
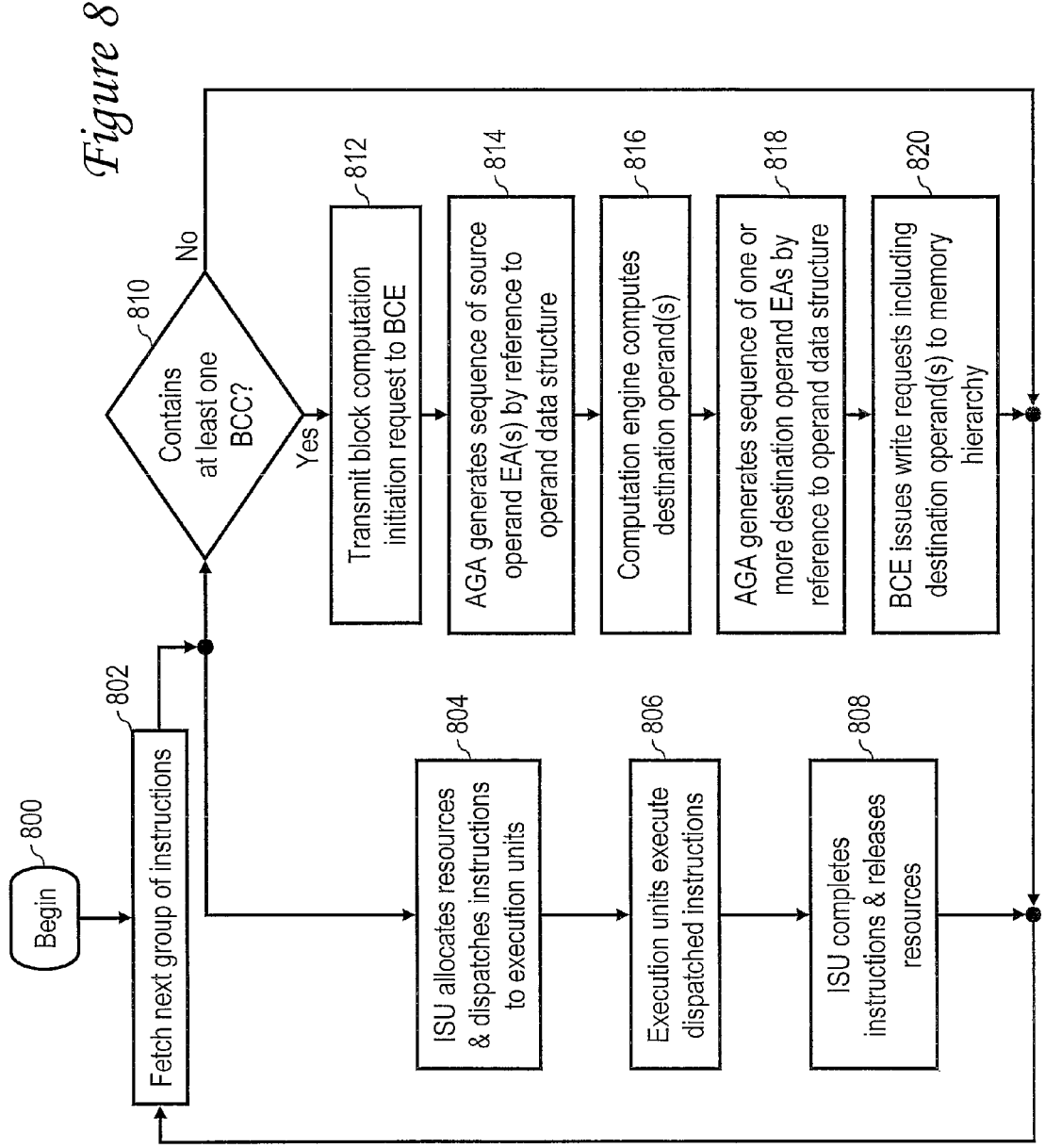
FIG. 8 is a high level logical flowchart of an exemplary method of block-driven computation in accordance with the present invention.

With reference now to FIG. 8, there is illustrated high level logical flowchart of an exemplary process of block-driven computation in accordance with the present invention. The illustrated process can be performed, for example, by processor core 200 of FIG. 3 and, in some implementations, multiple instances of the process can be performed concurrently by processor core 200 in one or more hardware threads. As a logical flowchart, at least some of the depicted steps can be performed concurrently or in a different order than illustrated.

As shown, the process begins at block 800 and then proceeds to block 802, which depicts ISU 306 fetching a next set of code in object code 704 for processing. The process depicted in FIG. 8 then bifurcates and proceeds to block 804 and to block 810.

Referring first to block 804, ISU 306 allocates the resources (e.g., rename and architected registers, buffers, etc.) that are to be utilized by execution units 320-328 in the execution of instructions within the fetched set of code and dispatches instructions within the fetched set of code to execution units 320-328. In response to receipt of the dispatched instructions, one or more of execution units 320-328 execute the dispatched instructions utilizing the allocated resources (block 806). Following instruction execution, ISU 306 completes the instructions and releases or reallocates the resources utilized during instruction execution. Thereafter, the process returns to block 802.

Referring now to block 810, ISU 306 determines whether the fetched set of code contains at least one block computation command (BCC). If not, the process returns to block 802, which has been described. If, however, ISU 306 determines that the fetched set of code includes at least one BCC, ISU 306 transmits to BCE 350 a block computation initiation request corresponding to each BCC, as shown at block 812. In at least some embodiments, the block computation initiation signal includes or references a pointer to the appropriate operand table 600 in operand data structure(s) 502 and appropriate entry 620 in operation data structure 512. If not present in the operand table 600, the block computation initiation request also preferably includes or references a pointer to a base effective address for each source or destination operand (e.g., SA, SB, DC).

In response to receipt of each block computation initiation signal, AGA 500 accesses the operand table 600 corresponding to the BCC. Utilizing the algorithm(s) indicated by the algorithm fields 604, AGA 500 generates a sequence of one or more EAs for source operands and issues the EAs to DMMU 340 in read requests (block 814). DMMU 340 translates the EAs into real addresses and then forwards the read requests to the memory hierarchy. The memory hierarchy responds to the read requests by supplying computation engine 510 with source operands associated with the real addresses. As long as no data dependencies are present, the source operands of the one or more iterations of the operation indicated by operation data structure 512 may be retrieved from the memory hierarchy in any order.

In addition at block 816, computation engine 510 computes one or more destination operands from the source operands obtained via the step depicted at block 814 utilizing the operation indicated by the designated entry of operation data structure 512. Computation engine 510 may perform multiple iterations of the operation in any order as source operands become available if data dependencies are observed. Computation engine 510 preferably caches the source and/or destination operands of the operations within the cache hierarchy in accordance with the cache policy or policies indicated in cache hint fields 610. Thus, differing cache policies can be applied to different operands of the same operation or of different operations based upon compiler provided information regarding reuse of the operand data.

Before, during and/or after the operations depicted at block 816, AGA 500 again accesses the operand table 600 corresponding to the BCC. Utilizing the algorithm(s) indicated by the algorithm field 604 for the destination operand(s), AGA 500 generates a sequence of one or more EAs for destination operands (block 818). As the destination operands are produced by computation engine 510 and the associated EAs are generated by AGA 500, BCE 350 issues write requests specifying the destination operand and associated EA to the memory hierarchy via DMMU 340 (block 820), which translates the EAs into a real addresses and forwards the write requests to the memory hierarchy for servicing. Following block 820, the process returns to block 802, which has been described.

While one or more embodiments have been particularly shown and described, it will be understood by those skilled in the art that various changes in form and detail may be made therein without departing from the spirit and scope of the invention. For example, although aspects of the present invention have been described with respect to a computer system executing program code that directs at least some functions, it should be understood that one or more embodiments of the present invention may alternatively be implemented as a program product for use with a data processing system. For example, compiler 702 may be realized as a program product. In addition, an operand data structure and post-processed code, such as object code 704, and optionally an operation data structure may together be realized as a program product. Such program product(s) include(s) a computer readable medium that encodes program code that directs the functions of the present invention. The computer readable medium may be implemented, for example, as a tangible storage medium (e.g., CD-ROM, DVD, diskette or hard disk, system memory, flash memory, etc.) or communication media, such as digital and analog networks.

What is claimed is:

1. A method of data processing in a data processing system, said method comprising:
   in response to receiving pre-processed code, a compiler identifying a code section in the pre-processed code that is not candidate for acceleration and identifying multiple code blocks in the pre-processed code that are candidates for acceleration, wherein each of the multiple code blocks specifies an iterated operation having at least a source operand and a destination operand, wherein each of multiple source operands for the iterated operation has a defined addressing relationship and each of multiple destination operands for the iterated operation has a defined addressing relationship;
   in response to identifying the code section, the compiler generating post-processed code containing one or more lower level instructions corresponding to the identified code section;
   in response to identifying each of the multiple code blocks:
      the compiler creating and outputting a respective operand data structure separate from the post-processed code, wherein the operand data structure includes a first algorithm field that specifies the defined addressing relationship between effective addresses of the multiple source operands, and further includes a second algorithm field that specifies the defined addressing relationship between effective addresses of the multiple destination operands;
      the compiler creating and outputting an entry among a plurality of entries in an operation data structure separate from the post-processed code, wherein each of the plurality of entries of the operation data structure identifies, for a respective one of the multiple code blocks, one of a plurality of iterated operations utilized to compute the destination operands from the source operands;
   for each of the multiple code blocks, the compiler placing a block computation command in the post-processed code that invokes processing of the corresponding operand data structure and corresponding entry in the operation data structure to compute operand addresses and destination operands; and
   the compiler outputting the post-processed code.

2. The method of claim 1, and further comprising:
   the compiler placing in the operand data structures caching policies for the source and destination operands.

3. The method of claim 1, and further comprising:
   the compiler indicating in the operand data structures, a first number of addresses to be generated to access the multiple source operands and a second number of addresses to be generated to access the multiple destination operands.

4. The method of claim 1, wherein creating an operand data structure comprises creating an operand table.

5. A program product, comprising:
   a tangible computer readable storage medium; and
   compiler program code stored within the tangible computer readable storage medium, wherein when processed by a data processing system the compiler program code causes the data processing system to perform:
      in response to receiving pre-processed code, a compiler identifying a code section in the pre-processed code that is not candidate for acceleration and identifying multiple code blocks in the pre-processed code that are candidates for acceleration, wherein each of the multiple code blocks specifies an iterated operation having at least a source operand and a destination operand, wherein each of multiple source operands for the iterated operation has a defined addressing relationship and each of multiple destination operands for the iterated operation has a defined addressing relationship;
      in response to identifying the code section, the compiler generating post-processed code containing one or more lower level instructions corresponding to the identified code section;
      in response to identifying each of the multiple code blocks:
         the compiler creating and outputting a respective operand data structure separate from the post-processed code, wherein the operand data structure includes a first algorithm field that specifies the defined addressing relationship between effective addresses of the multiple source operands, and further includes a second algorithm field that specifies the defined addressing relationship between effective addresses of the multiple destination operands;

the compiler creating and outputting an entry among a plurality of entries in an operation data structure separate from the post-processed code, wherein each of the plurality of entries of the operation data structure identifies, for a respective one of the multiple code blocks, one of a plurality of iterated operations utilized to compute the destination operands from the source operands;

the compiler placing a block computation command in the post-processed code that invokes processing of the operand data structure to compute operand addresses; and the compiler outputting the post-processed code.

6. The program product of claim 5, wherein the compiler program code, when processed by the data processing system, further performs:

the compiler placing in the operand data structures caching policies for the source and destination operands.

7. The program product of claim 5, wherein the compiler program code, when processed by the data processing system, further performs:

the compiler indicating in the operand data structures, a first number of addresses to be generated to access the multiple source operands and a second number of addresses to be generated to access the multiple destination operands.

8. The program product of claim 5, wherein creating an operand data structure comprises creating an operand table.

9. A program product, comprising:

a tangible computer readable storage medium; and program code stored within the tangible computer readable storage medium, wherein said program code includes:

multiple operand data structures, wherein each operand data structure includes a first algorithm field that specifies a first addressing relationship between effective addresses of multiple source operands of an iterated operation, a second algorithm field that specifies a second addressing relationship between effective addresses of multiple destination operands of the iterated operation;

an operation data structure including a plurality of entries each identifying, for a respective one of the multiple operand data structures, one of a plurality of iterated operations utilized to compute the destination operands from the source operands; and software code directing processing by a processor, the software code including a plurality of lower level instructions processable by a processor and a plurality of block computation commands, different from the lower level instructions, that when processed by the processor invokes, in parallel with execution of the lower level instructions by the processor, operation of a block computation engine within the processor on a respective one of the operand data structures and on a respective entry of the operation data structure to determine effective addresses of the multiple source and destination operands and to determine the multiple destination operands.

10. The program product of claim 9, wherein the operand data structures includes caching policies for the source and destination operands.

11. The program product of claim 9, wherein each of the operand data structures indicates a first number of addresses for the block computation engine to generate to access the multiple source operands and a second number of addresses for the block computation engine to generate to access the multiple destination operands.

12. The program product of claim 9, wherein the operand data structure comprises an operand table.

13. The method of claim 2, wherein the caching policies indicate at which level of a cache hierarchy each of the source and destination operands is to be cached.

14. The program product of claim 6, wherein the caching policies indicate at which level of a cache hierarchy each of the source and destination operands is to be cached.

15. The program product of claim 10, wherein the caching policies indicate at which level of a cache hierarchy each of the source and destination operands is to be cached.

* * * * *